United States Patent Office 2,810,927
Patented Oct. 29, 1957

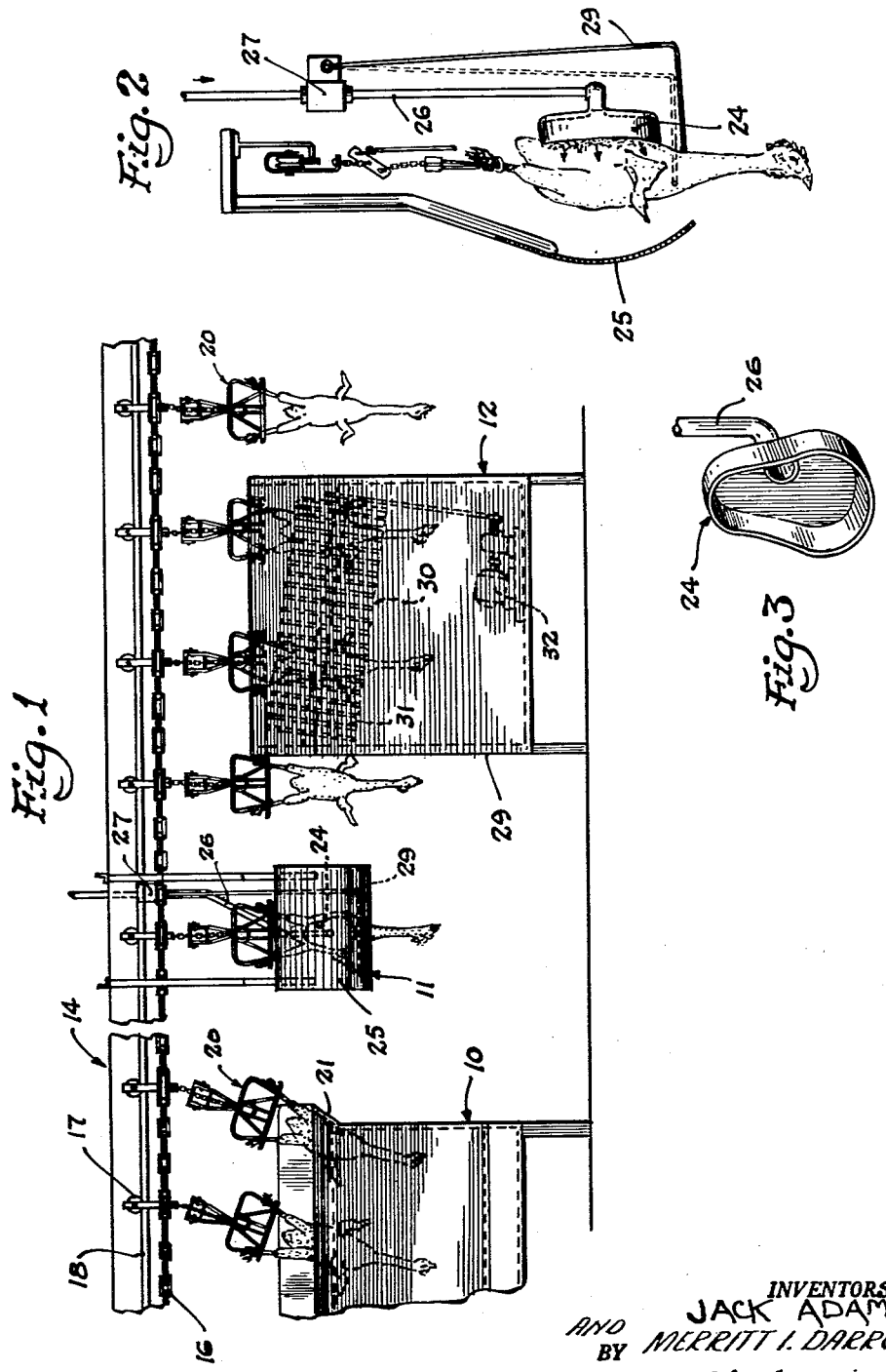

2,810,927

POULTRY BACK SCALDER

Jack Adams and Merritt I. Darrow, Chicago, Ill., assignors to Swift & Company, Chicago, Ill., a corporation of Illinois Original application November 4, 1952, Serial No. 318,587, now Patent No. 2,700,792, dated February 1, 1955. Divided and this application April 23, 1954, Serial No. 425,267

1 Claim. (Cl. 17—11.2)

This invention pertains to apparatus that facilitates the defeathering of fowl. More particularly, the invention provides apparatus which permits a more efficient and complete removal of broken feathers, pin feathers, and other matter from the back of fowl.

In the picking of poultry it is conventional practice to loosen the feathers prior to picking by immersing the fowl in hot water. This practice has proven objectionable because of the failure to develop scalding conditions which will loosen all feathers without damaging a portion of the fowl's skin. A lengthy scald at relatively high temperature is desirable from the standpoint of the easy removal of the feathers, but such a scald has its short comings in that the mechanical pickers commonly used will "bark" or remove outer layers of skin of the bird, spoiling the appearance and lessening the value of the product. For this reason the present practice is a compromise and certain areas of the feathers may prove to be particularly difficult to remove because they do not loosen as readily as the remainder with the operating temperatures employed. The present methods of scalding are particularly objectionable in the processing of birds having poorly feathered backs.

The principal object of the present invention is to provide apparatus for the scalding of the back side of a fowl so as to loosen all back feathers, including pin and broken stubs, and scabby areas without damaging the skin of other portions of the bird.

During the summer months and to some extent throughout the year, the dressing of poorly feathered fowl, which are frequently referred to as "bare backs," is a serious problem to the processing plants because of the difficulty of removing pin feathers and broken stub feathers from the back area. This inefficient removal necessitates a downgrading of the fowl and the resulting profit loss to the processing plant. Generally speaking, the apparatus of our invention for steaming the back of a fowl comprises a steam hood or chamber with an opening having a configuration adapted to fit snugly against the back of the fowl. A steam pipe opens into the chamber, and there is provided a valve for controlling the flow of the steam from a steam source to the chamber. A trigger arm is positioned to open the valve with the closing of the chamber opening by the carcass of the fowl being steamed.

The invention will be more fully understood from the following description read in connection with the accompanying drawings:

Figure 1 illustrates one embodiment of the invention utilizing in succession a conventional scald tank to the far left of the figure, a back scalding unit, and a slant drum picker;

Figure 2 is a side elevation of the back scalding unit of Figure 1; and

Figure 3 is a perspective of the steam ejection hood which is a portion of the back scalding unit.

In Figure 1 there is shown from left to right a conventional scald tank 10, a back scalding unit 11, and a slant picker 12. The birds are moved progressively from left to right by a conveyor system 14, made up of a horizontal chain 16 supported by several trolleys 17 which ride on a track 18. The trolleys and chain are moved at a uniform rate by a source of power not shown. Several detachable shackles 20 which are adapted for carrying birds are hooked at intervals on the conveyor chain. The shackles may be of any well-known type. A shackle contemplated is that shown and described in the De Vout patent, No. 2,035,948, issued March 31, 1936, or a modification thereof.

The birds first pass through the scalding tank, which tank may be any of the type known to the art that is adaptable to the operation. The temperature of the water of this tank is within the range conventionally employed, i. e., 118°–132° F. A chute 21 at the exit end of the tank slopes outwardly and upwardly in the direction of the line of movement of the birds. This chute lessens the swing of the bird as it falls free of the tank and at the same time reduces the loss of water from the scald tank, caused by the removal of the bird.

Following removal from the scald tank, the fowl being processed next passes through the back scald unit. The back scald unit (best illustrated in Figure 2) is made up of a steam ejection hood 24, a steam deflector 25, spaced from the hood and placed to deflect the steam emitting from the hood, and the necessary steam feed pipes 26 connecting the steam hood to the steam source (not shown). A valve 27 in the steam pipe which is actuated through movement of an operating lever 29 governs the flow of steam to the hood.

The steam feed pipe which extends down from the ceiling past the conveyor carries at its lower end the steam ejection hood at the height of the back of the fowl being processed. The outlet of the steam hood as illustrated is of a configuration that will snugly fit the back of a fowl so as to limit the direct steaming to the back area. The vertical section of the hood illustrated is roughly comparable to the longitudinal section of a pear, with the small end up and adapted to cover the back area of the carcass adjacent the tail. For the protection of the operating personnel, the steam pipe and hood are insulated and the steam deflector is provided to prevent the direct contact by the personnel with the steam blast. The deflector is spaced from the opening of the hood a distance sufficient to provide adequate clearance for the fowl which are moved therebetween. When the bird is in line with the hood, the operator pulls the bird into contact with it, sealing the bird's back against the outlet of the hood. This positioning of the bird trips the operating lever to actuate the valve, thereby opening the steam line to the flow of steam to the hood and the back of the bird. This operation requires only a brief interval. A steaming interval of 1½ to 2 seconds has proven satisfactory with many fowl. When the bird is moved out of contact with the operating lever, the spring-loaded valve closes.

The fowl, following the steaming operation, are moved by the conveyor to the conventional slant picker. The slant picker has a frame 29 which supports two spaced and inclined longitudinal drums 30. The spaced drums have parallel axes and are driven by a motor 32.

The drums cary a plurality of flexible picking fingers 31 made, for example, of rubber. The fowl being processed pass between the adjacent drums where the downwardly moving picking fingers of both drums stroke the carcass to remove substantially all the feathers. From this slant picker the fowl pass to further processing.

In operation of the embodiment of Figure 1, the individual birds suspended from the conveyor are first scalded in a conventional scald tank. While the particular local conditions will vary the exact details of operation to a certain extent, the birds are generally left in this first scald tank for a period of from 50–90 seconds, with the water temperature of approximately 118°–132° F. This length of scalding is sufficient to loosen most of the body feathers, but not so long as to cause any barking of the skin of the body during the picking operation. After leaving the first scald, the birds proceed through the back scald unit where a selective steam scald is applied only to the back for a limited period of approximately 1½ seconds to 2 seconds. The two scalds loosen all the feathers of the body, including the back feathers, to an extent that it is much easier to defeather than has been previously possible with the conventional practice of scalding the whole bird. The last operation illustrated is a defeathering operation in a conventional slant, double drum picker.

It should be understood that the picking machine illustrated and the sequence in which it is employed is only illustrative, and that different types of machines may be used in varying order.

This is a divisional application of co-pending United States patent application Serial No. 318,587, filed November 4, 1952, now Patent No. 2,700,792, issued February 1, 1955.

Obviously, many modifications and variations of the invention, as hereinbefore set forth, may be made without departing from the spirit and scope thereof, and therefore only such limitations should be imposed as are indicated in the appended claim.

We claim:

A back scalder for use in scalding birds supported by a shackle from an overhead conveyor, said scalder including a hood like member having a generally oval opening at one side thereof, the dimensions of said opening being no larger than the dimensions of the backs of said birds whereby the hood about the opening will form a seal with a back of a bird when an operator brings said enclosure into position against the back of the bird, a steam line communicating with the interior of said hood and a valve in said steam line, said valve having an operating member positioned immediately adjacent said hood to contact a bird when said hood is brought against the back of a bird to open said valve and to close said valve upon said hood being separated from said bird.

References Cited in the file of this patent

UNITED STATES PATENTS

| | | |
|---|---|---|
| 1,632,588 | Braun | June 14, 1927 |
| 2,041,001 | Knowlton | May 19, 1936 |
| 2,061,180 | Williams | Nov. 17, 1936 |
| 2,189,451 | Peters | Feb. 6, 1940 |